United States Patent [19]

Minami et al.

[11] 4,250,285

[45] Feb. 10, 1981

[54] PROCESS FOR POLYMERIZING OLEFINS AND CATALYSTS THEREFOR

[75] Inventors: Syuji Minami, Ohtake; Akinori Toyota, Iwakuni; Norio Kashiwa, Iwakuni, all of Japan

[73] Assignee: Mitsui Petrochemical Industries Ltd., Tokyo, Japan

[21] Appl. No.: 902,946

[22] Filed: May 4, 1978

Related U.S. Application Data

[63] Continuation of Ser. No. 758,325, Jan. 10, 1977, abandoned.

[30] Foreign Application Priority Data

Jan. 19, 1976 [JP] Japan ................................. 51/4056

[51] Int. Cl.$^3$ ........................... C08F 4/02; C08F 10/06
[52] U.S. Cl. ................................. 526/125; 252/429 B; 252/431 R; 526/121; 526/122; 526/142; 526/906; 526/143; 526/150; 526/151; 526/351
[58] Field of Search .......... 252/429 B, 429 C, 431 R; 526/125, 122, 142, 121

[56] References Cited

U.S. PATENT DOCUMENTS

| | | | |
|---|---|---|---|
| 3,991,260 | 11/1976 | Matsuura et al. | 526/125 |
| 4,069,169 | 1/1978 | Toyota et al. | 526/125 |
| 4,071,674 | 1/1978 | Kashiwa et al. | 526/125 |
| 4,076,924 | 2/1978 | Toyota et al. | 526/125 |
| 4,107,414 | 8/1978 | Giannini et al. | 526/125 |

FOREIGN PATENT DOCUMENTS

| | | | |
|---|---|---|---|
| 2461677 | 7/1975 | Fed. Rep. of Germany | 526/125 |
| 2504036 | 8/1975 | Fed. Rep. of Germany | 526/125 |

*Primary Examiner*—Edward J. Smith
*Attorney, Agent, or Firm*—Sherman & Shalloway

[57] ABSTRACT

A process for preparing a polymer or copolymer of an olefin having at least 3 carbon atoms which comprises polymerizing or copolymerizing an olefin having at least 3 carbon atoms and containing 0 to 10 mole % of another olefin or diolefin in the presence of a catalyst composed of (i) a solid titanium catalyst component and (ii) an organoaluminum compound; wherein the solid titanium catalyst component is obtained by contacting (1) a magnesium containing copulverization product comprising (A) an aluminum or germanium compound selected from the group consisting of aluminum compounds of the formula $AlR_nX_{3-n}$ wherein R is a hydrogen atom, or an alkyl, alkenyl, aryl, alkoxy, aryloxy or acyloxy group optionally having a substituent, X is a halogen atom, and $0 < n \leq 3$, and germanium compounds of the formula $GeR_mX_{4-m}$ wherein R and X are as defined above, and $0 \leq m \leq 4$, (B) a halogen-containing magnesium compound, and (C) an organic acid ester, the compounds (A) and (B), or the compounds (A), (B) and (C) being mechanically copulverized, with (2) a titanium compound (D) in the liquid phase in the absence of mechanical pulverization.

14 Claims, No Drawings

PROCESS FOR POLYMERIZING OLEFINS AND CATALYSTS THEREFOR

This is a continuation of application Ser. No. 758,325, filed Jan. 10, 1977, now abandoned.

This invention relates to an improved process for preparing highly stereoregular polymers or copolymers of olefins containing at least 3 carbon atoms in high yields, and a catalyst for use in this process.

A number of suggestions have previously been made in which olefins are polymerized or copolymerized in the presence of a catalyst composed of a solid titanium catalyst component and an organoaluminum compound. These suggestions teach different combinations of ingredients for preparing the solid titanium catalyst component and/or means for forming the titanium catalyst component as essential requirements. Failure to meet these requirements leads to poor results and in extreme cases, the catalyst does not show any utilizable polymerization activity.

One of such suggestions uses a solid titanium catalyst component which is obtained by reacting a halide of a metal of Group II of the periodic table having an electron donor coordinated therewith, such as a magnesium halide, with an organometallic compound of a metal of Groups I to III of the periodic table, such as an organoaluminum compound, and reacting the resulting reaction product with a transition metal compound such as a titanium compound (see Japanese Patent Publication No. 32,270/75 published Oct. 18, 1975). This patent states that the second step of reacting the reaction product of the first step with the transition metal compound may be performed under mechanically pulverizing conditions. However, it fails to state that mechanically pulverizing conditions are employed in the reaction of the halide having an electron donor coordinated therewith with the organometallic compound. The patent gives no information nor anticipation as to what effect would be caused on the catalytic activity of a solid titanium catalyst component obtained by reacting a titanium compound with the resulting reaction product if mechanically pulverizing conditions are employed in this reaction. This Publication discloses that a catalyst composed of the solid titanium catalyst component so obtained and an organoaluminum compound is especially suitable for the polymerization or copolymerization of ethylene. In fact, we have found that when this solid titanium catalyst component is utilized in the polymerization or copolymerization of olefins having at least 3 carbon atoms as intended by the present invention, it is difficult to obtain satisfactory results. We specifically found that when the solid titanium catalyst component in this suggestion is used in the polymerization or copolymerization of olefins having at least 3 carbon atoms, the stereoregularity of the polymer and the catalytic activity of the catalyst are unsatisfactory.

Another prior suggestion discloses a titanium catalyst component obtained by reacting an aluminum compound of the formula $Al(OR)_nX_{3-n}$ wherein R is an alkyl, aryl or aralkyl group, X is a halogen atom, and n is an integer between 1 and 3: when n is 2 or 3, groups R are identical or different (see British Pat. No. 1,438,990). It is stated in this patent that this method affords an advantage of producing a titanium catalyst component of superior quality without mechanical pulverization. Accordingly, mechanical pulverization is not at all performed, and Examples in this patent only illustrate the polymerization or copolymerization of ethylene or ethylene with up to 2 mole% of propylene. The Patent also states that the reaction of the $Al(OR)_nX_{3-n}$ compound with an anhydrous magnesium dihalide in the absence of mechical pulverization is performed in the presence or absence of an inert organic solvent such as hydrocarbons, alcohols, ethers, ketones, esters and the like. It has been found that when a solid titanium catalyst component prepared in accordance with this suggestion using the ester in the absence of mechanical pulverization is used in the polymerization or copolymerization of olefins having at least 3 carbon atoms, the stereoregularity of the polymer, the activity of the catalyst, or both, are unsatisfactory.

German Pat. No. 2,448,178 discloses a solid titanium catalyst component obtained by mechanically pulverizing a magnesium dihalide, an aluminum compound of the formula $Al(OR)_3$ wherein R is a hydrocarbon radical and a titanium compound either simultaneously or after adding the first two compounds first. This Patent also shows an example of the polymerization of ethylene or copolymerization of ethylene with at most 2% of propylene. Since in this suggestion, the mechanical pulverization of the entire ingredients is essential, the presence of a solvent can be avoided. In fact, the Patent is silent on the pulverization of the ingredients in the presence of solvent, and does not at all describe anything about the use of a solvent such as esters in the second-mentioned suggestion. We have found that the use of a solid titanium catalyst component obtained by reacting the above three components by mechanical pulverization in accordance with the method of the German Patent, too, can give only unsatisfactory results in the polymerization or copolymerization of olefins having at least 3 carbon atoms.

We found that according to the essential combinations of conditions taught by these prior suggestions, no satisfactory result can be obtained in the polymerization or copolymerization of olefins having at least 3 carbon atoms, and made extensive investigations in an attempt to provide a method for polymerizing olefins having at least 3 carbon atoms using catalysts having superior catalystic activity to give polymers having superior stereoregularity.

We have found that a solid titanium catalyst component which is obtained by contacting a magnesium-containing copulverization product comprising.

(A) an aluminum or germanium compound selected from the group consisting of aluminum compounds of the formula

$$AlR_nX_{3-n}$$

wherein R is a hydrogen atom, or an alkyl, alkenyl, aryl, alkoxy, aryloxy or acyloxy group optionally having a substituent, X is a halogen atom, and $O < n \leq 3$, and germanium compounds of the formula

$$GeR_mX_{4-m}$$

wherein R and X are as defined above, and $O \leq m \leq 4$, (B) a halogen-containing magnesium compound, and (C) an organic acid ester, the compounds (A) and (B), or the compounds (A), (B) and (C) being mechanically copulverized, with (D) a titanium compound in the liquid phase becomes a superior catalyst for polymerization or copolymerization of an α-olefin having at least 3 carbon atoms which can essentially overcome the above-mentioned disadvantages.

It has further been found that by polymerizing or copolymerizing an olefin having at least 3 carbon atoms optionally containing up to 10 mole% of another olefin or diolefin in the presence of a catalyst composed of (i) the above solid titanium catalyst component and (ii) an organoaluminum compound, a polymer or copolymer of an olefin containing at least 3 carbon atoms which has high stereoregularity can be produced in high yields.

Accordingly, it is an object of this invention to provide an improved process for producing polymers or copolymers of olefins having at least 3 carbon atoms.

Another object of this invention is to provide a catalyst useful for achieving the above improvement.

Other objects and advantages of this invention will become apparent from the following description.

In the aluminum compound (A) of the formula $AlR_nX_{3-n}$ used to form the solid titanium catalyst component used in this invention, R is alkyl, preferably containing 1 to 8 carbon atoms, more preferably 1 to 4 carbon atoms; alkoxy, preferably containing 1 to 12 carbon atoms, more preferably 1 to 8 carbon atoms; alkenyl, preferably containing 1 to 8 carbon atoms, more preferably 1 to 4 carbon atoms; aryl, preferably containing 6 to 12 carbon atoms, more preferably 6 to 8 carbon atoms, or aryloxy, preferably containing 2 to 13 carbon atoms, more preferably 2 to 9 carbon atoms. Where there are two or more R groups, they may be identical or different. These groups R may contain a substituent, such as alkyl containing 1 to 8 carbon atoms, aryl containing 6 to 12 carbon atoms, alkoxy containing 1 to 8 carbon atoms, aryloxy containing 6 to 12 carbon atoms, acyl containing 2 to 13 carbon atoms, or acyloxy containing 2 to 13 carbon atoms. In the formula, X represents a halogen atom, preferably Cl, Br or I, and n is a number $0 < n \leq 3$.

Specific examples of such aluminum compounds include $Al(C_2H_5)Cl_2$, $Al(OC_2H_5)Cl_2$, $Al(OCOCH_3)Cl_2$, $Al[OC_6H_3-2,6-(CH_3)_2]Cl_2$, $Al(CH_3)Cl_2$, $Al(OCH_3)Cl_2$, $Al(C_2H_5)_2Cl$, $Al(OC_2H_5)(C_2H_5)Cl$, $Al(OC_2H_5)_2Cl$, $Al[OC_6H_3-2,6-(CH_3)_2]_2Cl$, $Al(OCOCH_3)(C_2H_5)Cl$, $Al(OCOCH_3)_2Cl$, $Al(OC_2H_5)(OCOC_2H_5)Cl$, $Al(OCOC_6H_5)(OC_2H_5)Cl$, $Al(C_2H_5)_3$, $Al(iso-C_4H_9)_3$, $Al(OC_2H_5)(C_2H_5)_2$, $Al(OC_2H_5)_2C_2H_5$, $Al(OC_2H_5)_3$, $Al(OCOCH_3)(C_2H_5)_2$, $Al(OCOCH_3)(OC_2H_5)_2$, $Al(OCOC_6H_5)(C_2H_5)_2$, $Al(OCOC_6H_5)(OC_2H_5)_2$, and those of the halogen-containing aluminum compounds listed above of which chlorine has been replaced by Br or I. Of these compounds, those containing at least one alkoxy group are preferred. $Al(OC_2H_5)_3$ and $Al(OC_2H_5)_2Cl$ are especially preferred because of their ease of industrial synthesis.

In the germanium compounds of formula $GeR_mX_{4-m}$, R and X are as defined above with regard to the organoluminum compound, and m is a number $0 \leq m \leq 4$. Specific examples of the germanium compounds are $GeCl_4$, $Ge(CH_3)Cl_3$, $Ge(CH_3)_2Cl_2$, $Ge(CH_3)_3Cl$, $Ge(CH_3)_4$, $Ge(C_2H_5)Cl_3$, $Ge(C_2H_5)_2Cl_2$, $Ge(C_2H_5)_3Cl$, $Ge(C_2H_5)_4$, $Ge(CH_3)_3(OC_2H_5)$, $Ge(CH_3)_3[OC_6H_3[OC_6H_3-2,6-(CH_3)_2]$, $Ge(CH_3)_2(OC_2H_5)_2$, $Ge(CH_3)(OC_2H_5)_3$, $Ge(OC_2H_5)_4$, $Ge(OCOC_6H_5)(C_2H_5)_3$, $Ge(OCOC_6H_5)_2(C_2H_5)_2$, $Ge(OCOC_6H_5)_3(C_2H_5)$, $Ge(OCOCH_3)(C_2H_5)_3$, $Ge(OCOCH_3)_2(C_2H_5)_2$, $Ge(OCOCH_3)_3(C_2H_5)$, $Ge(OCOC_6H_5)_2(OC_2H_5)_2$, and those of the halogen-containing germanium compounds listed above of which Cl has been replaced by Br or I.

The aluminum or germanium compound (A) may be a complex of two or more of the compounds exemplified above, or a compound which contains at least two aluminum or germanium atoms per molecule. Moreover, the compound (A) may be used in the form of a complex with the halogen-containing magnesium compound (B) to be mechanically pulverized together. Or it may be used in the form of a complex with the organic acid ester (C).

Examples of the halogen-containing magnesium compound (B) used to form the solid titanium catalyst component include magnesium dihalides and halogen-containing organic magnesium compounds containing an organic group selected from alkoxy, preferably containing 1 to 12 carbon atoms, alkyl, preferably containing 1 to 12 carbon atoms, and acyloxy, preferably containing 2 to 13 carbon atoms in addition to a halogen atom. The magnesium dihalides are preferred. Suitable magnesium dihalides are magnesium dichloride, magnesium dibromide and magnesium diiodide, the magnesium dichloride being most preferred. Preferably, the halogen-containing magnesium compound should be substantially anhydrous. The term substantially anhydrous means that a moisture content which does not adversely affect the performance of the catalyst is permissible. For the convenience of handling, it is advantageous to use the halogen-containing magnesium compound as a powder having an average particle size of 1 to 50 microns. Larger particle sizes may be feasible since pulverization is done during the preparation of the titanium catalyst component.

Suitable organic acid esters (C) used for the formation of the solid titanium catalyst component in the present invention include, for example, aliphatic carboxylic acid esters, esters of halogenated aliphatic carboxylic acids, and aromatic carboxylic acid esters, formed between (1) carboxylic acids or halocarboxylic acids selected from the group consisting of saturated or unsaturated aliphatic carboxylic acids containing 1 to 8 carbon atoms, preferably 1 to 4 carbon atoms, halogen-substituted derivatives thereof, and aromatic carboxylic acids containing 7 to 12 carbon atoms, preferably 7 to 10 carbon atoms and (2) alcohols or phenols selected from the group consisting of saturated or unsaturated aliphatic primary alcohols containing 1 to 8 carbon atoms, preferably 1 to 4 carbon atoms, saturated or unsaturated alicyclic alcohols containing 3 to 8 carbon atoms, preferably 5 to 6 carbon atoms, saturated or unsaturated aliphatic primary alcohols bonded to an alicyclic or aromatic ring with 3 to 10 carbon atoms, and phenols containing 6 to 10 carbon atoms, preferably 6 to 8 carbon atoms.

Examples of the aliphatic carboxylic acid esters include alkyl esters of saturated fatty acids such as methyl formate, ethyl acetate, n-amyl acetate, 2-ethylhexyl acetate, n-butyl formate, ethyl butyrate and ethyl valerate, alkyl esters of unsaturated fatty acids such as methyl acrylate, methyl methacrylate, and n-butyl crotonate, and alkenyl esters of saturated fatty acids such as vinyl acetate and allyl acetate.

Examples of the esters of halogenated carboxylic acids are methyl chloroacetate and ethyl dichloroacetate.

Examples of the aromatic carboxylic acid ester are alkyl esters of benzoic acid such as methyl benzoate, ethyl benzoate, n-propyl benzoate, n- or i-butyl benzoate, n- or i-amyl benzoate, n-hexyl benzoate, n-octyl or 2-ethylhexyl benzoate, and ethyl chlorobenzoate, alkyl esters of toluic acid such as methyl toluate, ethyl toluate, n- or i-butyl toluate, and 2-ethylhexyl toluate, alkyl esters of anisic acid such as methyl anisate, ethyl anisate, and n-propyl anisate, and alkyl ester of naphthoic acid such as methyl naphthoate, n-propyl naphthoate, n-butyl naphthoate, and 2-ethylhexyl naphthoate.

Of these esters, the aromatic carboxylic acid esters are preferred. $C_1$-$C_4$ alkyl esters, especially methyl or ethyl esters, of benzoic acid, p-toluic acid or p-anisic acid are especially preferred.

The solid titanium catalyst component (i) used in the present invention is formed by contacting the magnesium-containing copulverization product obtained by mechanically copulverizing the aluminum or germanium compound (A) and the halogen-containing magnesium compound (B), or the aluminum or germanium compound (A), the halogen-containing magnesium compound (B) and the organic acid ester (C), with the titanium compound in the liquid phase (D) in the absence of mechanical pulverization.

The term "mechanical copulverization", as used herein, means pulverization by milling which gives the ingredients a violent mechanical pulverizing effect, for example, by a ball mill, vibratory mill, or impact mill. The term thus excludes an ordinary stirring-mixing means such as mixing these ingredients merely by a stirrer. On the other hand, the term "in the absence of mechanical pulverization" means that the aforesaid milling pulverization is not performed.

The mechanical copulverization is carried out by the milling means preferably in the substantial absence of oxygen and water. The organic acid ester (C) may be subjected to the copulverization treatment, or may be contacted in the absence of mechanical pulverization with the copulverization product of the aluminum or germanium compound (A) and the halogen-containing magnesium compound (B). The amount of the component (A) is preferably about 0.001 to about 10 moles, more preferably about 0.01 to about 5 moles, especially preferably about 0.01 to about 1 mole, per mole of the component (B). The amount of the component (C) is preferably about 0.005 to about 10 moles, more preferably about 0.01 to about 1 mole, especially preferably about 0.05 to about 0.5 mole, per mole of the component (B).

The copulverization time is generally from about 1 hour to about 10 days, although varying according to the type of the apparatus used. Usually, the pulverization is carried out at room temperature, and no cooling or heating is required in particular. Where there is a vigorous exotherm, the system may be suitably cooled.

Since the component (C) may or may not be subjected to mechanical pulverization, it may be contacted with the copulverization product of the components (A) and (B), or may be present during the copulverization of the components (A) and (B). The latter is superior for obtaining catalysts of good performance. At this time, the organic acid ester (C) may be added in the free form, or as a complex with (A) or (B).

When the former means is employed, it is preferred to contact the organic acid ester (C) with the copulverization product of the components (A) and (B) in an inert solvent. Examples of the inert solvent used for this purpose are aliphatic hydrocarbons such as n-pentane, iso-pentane, n-hexane, iso-hexane, n-heptane, n-octane, 2-ethylhexane, n-decane, and kerosene, alicyclic hydrocarbons such as cyclopentane, cyclohexane, and methylcyclohexane, aromatic hydrocarbons such as benzene, toluene, xylene ethylbenzene, cumene, cymene, mesitylene, pseudocumene, and butyl benzene, halogenated hydrocarbons such as methylene chloride, ethyl chloride, ethylene chloride, trichloroethylene, chlorobenzene, n-propyl chloride, iso-propyl chloride, and chloroform, and carbon halides such as carbon tetrachloride. Of these inert solvents, aliphatic hydrocarbons are preferred.

In the copulverization of the components (A) and (B) in the presence or absence of the component (C), an organic or inorganic extender, such as polyethylene, polystyrene, silicon oxide or boron oxide, may be copresent. When the component (A) is to be newly synthesized without using a commercially available compound, some steps such as drying can be omitted by performing the synthesis in an inert solvent and copulverizing the product with the component (B) without separating it from the reaction system. Pulverization at this time can be performed in good condition by adjusting the amount of the inert solvent to not more than 20 ml per mole of the component (B).

The magnesium-containing copulverization product so obtained is then contacted in the absence of mechanical pulverization with the titanium compound (D) in the liquid phase. Where the titanium compound is liquid under the contacting conditions, it can be used as such. Or it may be used after dilution with an inert solvent. Where the titanium compound is solid under the contacting conditions, it can be used after dissolving in a suitable solvent. Preferably, the contacting is performed by suspending the magnesium-containing copulverization product in the liquid titanium compound; or the liquid titanium compound and the magnesium-containing copulverization product are contacted in an inert solvent such as hexane, heptane, or kerosene.

The inert solvent used to dissolve the solid titanium compound includes, for example, pentane, hexane, heptane, or kerosene.

The reaction between the titanium compound and the magnesium-containing copulverization product by contacting can be carried out by stirring the ingredients preferably at room temperature to about 200° C. for a period of, say, about 10 minutes to about 5 hours. It is preferred that after the reaction, the resulting solid titanium catalyst (i) is well washed with an inert solvent such as pentane, hexane, heptane or kerosene to remove the free titanium compound.

The amount of the titanium compound (D) used in the above reaction is preferably about 0.001 to 100 moles, more preferably about 0.01 to about 30 moles, especially preferably about 0.01 to about 10 moles.

Suitable titanium compounds (D) are tetravalent titanium compounds of the formula $$Ti(OR)_g X_{4-g}$$

wherein R is an alkyl group, X is a halogen atom, and $0 \leq g \leq 4$.

Specific examples of these titanium compounds are titanium tetrahalides such as $TiCl_4$, $TiBr_4$ and $TiI_4$, alkoxy titanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{ iso-}C_4H_9)Br_3$, alkoxy titanium dihalides such as $Ti(OCH_3)_2Cl_2$ $Ti(OC_2H_5)_2Cl_2$ $Ti(O\text{ n-}C_4H_9)_2Cl_2$ and $Ti(OC_2H_5)_2Br_2$, trialkoxy titanium monohalides such as $Ti(OCH_3)_3Cl$, $Ti(OC_2H_5)_3Cl$, $Ti(O\text{ n-}C_4H_9)_3Cl$, and $Ti(OC_2H_5)_3Br$, and tetraalkoxy titanium such as $Ti(OCH_3)_4$, $Ti(OC_2H_5)_4$, and $Ti(O\text{ n-}C_4H_9)_4$. Of these, the titanium tetrahalides are preferred, and titanium tetrachloride is especially preferred.

The solid titanium catalyst component (i) so prepared contains magnesium, titanium, halogen, the organic acid ester and either aluminum or germanium, and its composition does not substantially change by washing with an inert solvent. In many cases, the titanium/magnesium atomic ratio in the resulting catalyst component is about ½ to about 1/16, and the halogen/titanium atomic ratio in the compound is about 5/1 to about 40/1. The surface area of the titanium catalyst component is usually at least about 3 m²/g, in most cases at least about 50 m²/g.

According to the process of this invention olefins having at least 3 carbon atoms are polymerized or copolymerized in the presence of a catalyst composed of the solid titanium catalyst component (i) and the organoaluminum compound (ii). Examples of the olefin having at least 3 carbon atoms are propylene, 1-butene, and 4-methyl-1-pentene. Copolymerization of an olefin containing at least 3 carbon atoms with not more than 10 mole% of other olefins or diolefins can also be performed. Thus, the process of this invention can exhibit superior results in the polymerization of olefins having at least 3 carbon atoms or copolymerization thereof with up to 10 mole% of other olefins or diolefins. The other olefins copolymerizable with the above olefins are, for example, ethylene, propylene, 1-butene, and 4-methyl-1-pentene. Examples of the diolefins are non-conjugated diolefins such as dicyclopentadiene, or ethylidenenorbornene, and conjugated diolefins such as butadiene or isoprene. The copolymerization includes random copolymerization and block copolymerization.

Suitable organoaluminum compounds to be combined with the solid titanium catalyst component are organoaluminum compounds having a hydrocarbon group directly bonded to aluminum which are expressed by the formula

$R'_{3-p}AlX_p$ wherein R' is a hydrogen atom, an alkyl or aryl group, X is a halogen atom, and p is 0 or a positive number of less than 3,

$R'_{3-q}Al(OR)_q$ wherein R' is as defined above and q is a positive number of greater than 0 but less than 3.

Examples are alkyl aluminum compounds, alkyl aluminum alkoxides, alkyl aluminum halides, and alkyl aluminum alkoxyhalides, which may be selected from the examples listed hereinabove as component (A). Specific examples of these aluminum compounds are triethyl aluminum, diethyl aluminum hydride, tripropyl aluminum, tributyl aluminum, diethyl aluminum chloride, diethyl aluminum bromide, diethyl aluminum ethoxide, diethyl aluminum phenoxide, ethyl aluminum ethoxychloride, and ethyl aluminum sesquichloride. Of these, the trialkyl aluminums such as triethyl aluminum or tributyl aluminum, and the dialkyl aluminum halides such as diethyl aluminum chloride are preferred.

In the process of this invention, the proportions of components (i) and (ii) is such that the ratio of aluminum atom to the titanium atom in component (i) is from about 1 to about 10,000, preferably from about 1 to about 500.

Polymerization can be performed either in the liquid phase or in the gaseous phase. When it is carried out in the liquid phase, an inert solvent such as hexane, heptane or kerosene may be used as a reaction medium, but the olefin itself may be used as a reaction medium. In the liquid-phase polymerization, it is preferred that the amount of the solid titanium catalyst component (i) should be about 0.001 to about 0.5 millimole, calculated as titanium atom per liter of the liquid phase, and the amount of the organoaluminum compound (ii) should be about 0.1 to about 50 millimoles calculated as the aluminum atom. When the reaction is carried out in the gaseous phase, the solid titanium catalyst component (i) is used in an amount of preferably 0.001 to 1.0 millimole/liter of gaseous phase, more preferably 0.01 to 0.5 millimole/liter of gaseous phase, calculated as titanium atom. The organoaluminum compound (ii) is used preferably in an amount of 0.1 to 50 millimoles/liter of gaseous phase calculated as titanium atom.

In the polymerization in accordance with the process of this invention, a molecular weight controller such as hydrogen may be used. Furthermore, in order to control the stereoregularity of α-olefins having at least 3 carbon atoms, electron donors such as ethers, ethylene glycol derivatives, amines, sulfur-containing compounds, nitriles, or esters, for example, may be present in the polymerization system. It is particularly preferred to use aromatic carboxylic acid esters, for example, esters of benzoic acid, p-toluic acid, or anisic acid, same as exemplified hereinabove with regard to the preparation of the solid titanium catalyst component (i), as the stereoregularity controller. The stereoregularity controller may be used in the form of an adduct with the organoaluminum compound (ii). The effective amount of the stereoregularity controller is amount 0.001 to about 10 moles, preferably about 0.01 to about 2 moles, more preferably about 0.1 to about 1 mole, per mole of the organoaluminum compound.

The polymerization temperature is preferably about 20° to about 200° C., more preferably about 50 to about 180° C., and the polymerization pressure is from atmospheric pressure to about 50 kg/cm², preferably about 2 to about 20 kg/cm².

The polymerization can be performed batchwise, semi-continuously, or continuously. Or it can be carried out in a multiple of stages under different reaction conditions.

The following Examples and Comparative Examples illustrate the present invention in greater detail.

EXAMPLES 1 AND 2 AND COMPARATIVE EXAMPLES 1 TO 11

Ethanol (0.6 mole) was added to 100 ml of hexane, and 0.2 mole of Al(C₂H₅)₃ was gradually added dropwise at room temperature. After the reaction, hexane was evaporated until the reaction product became dry to afford 32.4 g of Al(OC₂H₅)₃.

Commercially available anhydrous magnesium chloride (20 g), 6.0 ml of ethyl benzoate and 3 g of Al(OC₂H₅)₃ so prepared were placed into a stainless steeel (SUS 32) ball mill cylinder having a capacity of 800 ml and an inside diameter of 100 mm and accomodating therein 100 stainless steel (SUS 32) balls each with a diameter of 15 mm is an atmopsphere of nitrogen, and were copulverized for 100 hours at a rotating speed of 125 rpm.

The resulting magnesium-containing copulverized product was suspended in 300 ml of kerosene containing 30 ml of titanium tetrachloride, and the suspension was stirred at 100° C. for 2 hours. After the reaction, the solid portion was collected by filtration, and thoroughly washed with hexane to afford a solid titanium catalyst component (i) which contained, in terms of atoms, 3.5% by weight of titanium, 62.3% by weight of chlorine, 12.5% by weight of ethyl benzoate, and 4.5% by weight of aluminum.

A 2-liter autoclave was charged with 750 ml of hexane from which oxygen and moisture had been thoroughly removed, and in an atmosphere of propylene at 40° C., 5.0 millimoles of triethyl aluminum and 1.59 millimoles of methyl p-toluate were fed. Five minutes later, the titanium catalyst component was charged into the autoclave in an amount of 0.02 millimole calculated as titanium atom. The mixture was heated to 60° C., and the total pressure of the reaction system was elevated to 8.0 kg/cm² by feeding propylene. Subsequently, 350 ml of hydrogen was introduced, and propylene was polymerized for 5 hours. After the polymerization, the solid component was collected by filtration to afford 320 g of polypropylene as a white powder. It had a boiling n-heptane residue of 97%, an apparent density of 0.32 g/ml, and a melt index of 4.8. On the other hand, concentration of the liquid portion afforded 12.6 g of a polymer soluble in boiling n-heptane. The catalyst showed an average specific polymerization activity of 416 g-pp/Ti-mmol.hr.atm.

The results (Example 1) obtained are shown in Table 1.

The same procedure as in Example 1 was repeated except that the components (A), (B) and (C) were changed. The results are also shown in Table 1 (Example 2).

Comparative Examples 1 to 11 were performed in the same way as in Example 1 except that the conditions employed were outside the scope of the present invention.

In the table, the term "non-copulverization" means that mechanical copulverization by ball mill was omitted, and the term "copulverization" means that mechanical copulverization by a ball mill same as in Example 1 was performed.

TABLE 1

| Example (Ex.) or Comparative Example (CE.) | (i) Solid titanium catalyst component | | | | (D) Titanium compound in liquid phase | | Polypropylene formed | | |
|---|---|---|---|---|---|---|---|---|---|
| | Component (A) | Component (B) | Component (C) | Method of preparation | Component (D) | Method of preparation | Stereoregularity of Powder [Boiling n heptane residue (%)] | Average specific polymerization activity g-[PP/Ti-mmol. hr. atm] | Amount of powder yield (gr) |
| Ex.1 | Al(OC$_2$H$_5$)$_3$ | MgCl$_2$ | Ethyl benzoate | [(A) + (B) + (C)] copulverization | TiCl$_4$ | Suspended in TiCl$_4$ in kerosene | 97 | 416 | 320 |
| CE.1 | " | " | Ethyl benzoate | [(A) + (B)] + (C) non-copulverization | " | Suspended in TiCl$_4$ in kerosene | 79 | 128 | 87 |
| CE.2 | " | " | Ethyl benzoate | [(A) + (B)] + (C) non-copulverization | " | Copulverized with TiCl$_4$ | 84 | 178 | 128 |
| CE.3 | " | " | — | [(A) + (B)] copulverization | " | Suspended in TiCl$_4$ in kerosene | 83 | 213 | 70 |
| CE.4 | " | " | — | [(A) + (B)] copulverization | " | Copulverized with TiCl$_4$ | 78 | 236 | 89 |
| CE.5 | — | " | Ethyl benzoate | [(B) + (C)] copulverization | " | Suspended in TiCl$_4$ kerosene | 92 | 293 | 225 |
| CE.6 | — | " | Ethyl benzoate | [(B) + (C)] non-copulverization | " | Copulverized with TiCl$_4$ | 87 | 195 | 145 |
| CE.7 | — | " | Ethyl benzoate | [(B) + (C)] copulverization | " | Copulverized with TiCl$_4$ | 88 | 176 | 132 |
| Ex.2 | Ge(OCOCH$_3$)$_4$ | " | Ethyl benzoate | [(A) + (B) + (C)] copulverization | " | Suspended in TiCl$_4$ kerosene | 96 | 352 | 275 |
| CE.8 | " | " | Ethyl benzoate | [(A) + (B)] + (C) non-copulverization | " | Suspended in TiCl$_4$ kerosene | 78 | 135 | 68 |
| CE.9 | " | " | Ethyl benzoate | [(A) + (B)] + (C) non-copulverization | " | Copulverized with TiCl$_4$ | 86 | 152 | 98 |
| CE.10 | " | " | — | [(A) + (B)] copulverization | " | Suspended in TiCl$_4$ kerosene | 82 | 223 | 83 |
| CE.11 | " | " | — | [(A) + (B)] copulverization | " | Copulverized with TiCl$_4$ | 74 | 198 | 69 |

EXAMPLE 3

Ethanol (0.9 mole) was added to 35 ml of hexane, and 0.3 mole of Al(C$_2$H$_5$)$_3$ was gradually added dropwise at room temperature to afford Al(OC$_2$H$_5$)$_3$ dissolved in hexane.

Commercially available anhydrous magnesium chloride (20 g), 50 ml of ethyl benzoate and 5 ml of the hexane solution of $Al(OC_2H_5)_3$ obtained were charged into the same ball mill as used in Example 1 in an atmosphere of nitrogen, and contacted with one another for 100 hours at a rotating speed of 125 rpm.

The resulting magnesium-containing copulverized product was suspended in 300 ml of kerosene containing 30 ml of titanium tetrachloride, and the suspension was stirred at 100° C. for 2 hours. After the reaction, the solid portion was collected by filtration, and washed thoroughly with hexane to afford a solid titanium catalyst component (i) which contained, in terms of atoms, 3.3% by weight of titanium, 61.5% by weight of chlorine, 3.6% by weight of aluminum and 12.7% by weight of ethyl benzoate.

Propylene was polymerized under the same conditions as in Example 1 except that the solid catalyst component was used in an amount of 0.02 millimole calculated as titanium atom. There were obtained 365 g of polypropylene as a white powder and 13.5 g of a solvent-soluble polymer. The white powdery polypropylene had a boiling n-heptane residue of 97%, an apparent density of 0.35 g/ml, and a melt index of 4.5. The catalyst showed an average specific polymerization activity of 473 g-PP/Ti-mmol.hr.atm.

EXAMPLES 4 TO 13

A solid catalyst component was prepared in the same way as in Example 1 using various aluminum compounds instead of $Al(OC_2H_5)_3$, and propylene was polymerized in the same way as in Example 1 using the resulting solid catalyst components. The results are shown in Table 2. The alkoxide compounds are synthesized in the same way as in Example 1.

ple 1 were placed in the same ball mill as used in Example 1 in an atmosphere of nitrogen, and contacted with each other for 100 hours at a rotating speed of 125 rpm. The resulting solid copulverized product was suspended in 200 ml of kerosene, and 6 ml of ethyl benzoate was added. The mixture was heated to 80° C., and reacted for 2 hours. After the reaction, the solid portion was collected by filtration, washed with hexane, and dried. The resulting Mg-containing copulverized product was suspended in 300 ml of kerosene containing 30 ml of titanium tetrachloride, and the suspension was stirred at 100° C. for 2 hours. After the reaction, the solid portion was collected by filtration, and washed thoroughly with hexane to afford a solid catalyst component (i) which contained, in terms of atoms, 2.9% by weight of titanium, 63.7% by weight of chlorine, 6.2% by weight of aluminum, and 12.1% by weight of ethyl benzoate.

Propylene was polymerized under the same conditions as in Example 1 except that 0.02 millimole, calculated as titanium atom, of the solid catalyst component (i) was used. There were obtained 290 g of polypropylene as a white powder and 11.3 g of a solvent-soluble polymer. The white powdery polypropylene had a boiling n-heptane residue of 97%, an apparent density of 0.33 g/ml and a melt index of 3.9. The catalyst used showed an average specific polymerization activity of 377 g-PP/Ti-mmol.hr.atm.

EXAMPLES 15 TO 18

A titanium catalyst was prepared in the same way as in Example 1 except that each of the germanium compounds shown in Table 3 was used instead of the aluminum triethoxide used in Example 1. Propylene was polymerized in the same way as in Example 1 using each of the catalysts obtained. The results are shown in Table 3.

TABLE 2

| | Raw material for catalyst Al compound | | Contents (% by weight) of the ingredient of the solid catalyst component (i) | | | | Results of polymerization | | | | | |
|---|---|---|---|---|---|---|---|---|---|---|---|---|
| Example | Name | Amount | Ti | Cl | Organic acid ester | Al | Powder-solid (g) | Soluble polymer (g) | Extraction residue of the powder (%) | Apparent density (g/ml) | Melt index | Average specific polymerization activity * |
| 4 | $Al(C_2H_5)_3$ | 3ml | 3.5 | 66.0 | 9.7 | 5.4 | 258 | 11.5 | 97 | 0.33 | 3.5 | 337 |
| 5 | $AlC_2H_5 \cdot (OC_2H_5)_2$ | 3ml | 3.2 | 63.0 | 10.1 | 4.3 | 305 | 12.1 | 96 | 0.32 | 4.2 | 396 |
| 6 | $Al(C_2H_5)_2Cl$ | 3ml | 2.8 | 59.5 | 7.8 | 6.2 | 235 | 12.6 | 96 | 0.29 | 3.7 | 310 |
| 7 | $Al(OC_2H_5)_2Cl$ | 3 g | 2.5 | 60.0 | 12.4 | 4.7 | 312 | 10.5 | 95 | 0.34 | 3.0 | 403 |
| 8 | $AlC_2H_5 \cdot Cl_2$ | 3ml | 2.9 | 59.2 | 11.6 | 5.1 | 296 | 13.3 | 97 | 0.33 | 4.2 | 387 |
| 9 | $Al(OC_2H_5) \cdot Cl_2$ | 3 g | 3.3 | 62.8 | 9.2 | 6.2 | 357 | 12.5 | 95 | 0.31 | 2.3 | 462 |
| 10 | $Al(O \text{ iso-}C_4H_9)_3$ | 3 g | 3.1 | 64.3 | 13.0 | 6.0 | 340 | 9.8 | 94 | 0.32 | 4.0 | 429 |
| 11 | $Al(OC_2H_5)_2(OCOC_6H_5)$ | 3 g | 3.0 | 54.9 | 10.9 | 3.8 | 276 | 10.2 | 96 | 0.30 | 5.0 | 358 |
| 12 | $Al[OC_6H_3\text{-}2.6\text{-}(CH_3)_2]Cl_2$ | 3 g | 2.9 | 63.8 | 12.2 | 6.3 | 285 | 9.8 | 97 | 0.31 | 5.0 | 369 |
| 13 | $Al(CH_2COCHCOCH_3)_3$ | 3 g | 3.0 | 61.0 | 12.5 | 6.0 | 250 | 8.7 | 96 | 0.33 | 4.8 | 323 |

* g-PP/Ti-mmol · hr · atm

EXAMPLE 14

Commercially available anhydrous magnesium chloride (20 g) and 3 g of $Al(OC_2H_5)_3$ synthesized in Exam-

TABLE 3

| | Raw material (A) for catalyst | | Contents (% by weight) of the ingredients of the solid titanium catalyst component | | | | Results of polymerization | | | | | |
|---|---|---|---|---|---|---|---|---|---|---|---|---|
| Example | Name | Amount | Ti | Cl | Organic acid ester | Metal in the raw material (A) | Solid Powder (g) | Soluble polymer (g) | Extraction residue of the powder (%) | Apparent density (g/ml) | Melt index | Average specific polymerization activity * |
| 15 | $GeCl_4$ | 5ml | 3.3 | 61.3 | 9.7 | 1.5 | 322 | 11.0 | 97 | 0.33 | 2.6 | 416 |

TABLE 3-continued

| Example | Raw material (A) for catalyst Name | Amount | Contents (% by weight) of the ingredients of the solid titanium catalyst component | | | | Results of polymerization | | | | | |
|---|---|---|---|---|---|---|---|---|---|---|---|---|
| | | | Ti | Cl | Organic acid ester | Metal in the raw material (A) | Solid Powder (g) | Soluble polymer (g) | Extraction residue of the powder (%) | Apparent density (g/ml) | Melt index | Average specific polymerization activity * |
| 16 | Ge(C₂H₅)Cl₅ | 5ml | 3.2 | 60.2 | 12.6 | 5.2 | 311 | 13.2 | 97 | 0.30 | 5.3 | 405 |
| 17 | Ge(OC₂H₅)₄ | 4ml | 3.4 | 58.5 | 11.6 | 6.2 | 330 | 15.1 | 96 | 0.29 | 3.9 | 431 |
| 18 | Ge(C₂H₅)₃(OCOC₃H₅) | 5ml | 2.8 | 62.3 | 13.4 | 0.2 | 295 | 12.2 | 97 | 0.30 | 6.2 | 384 |

* g-PP/Ti-mmol · hr · atm

EXAMPLES 19 TO 23

A titanium catalyst was prepared in the same way as in Example 1 except that each of the magnesium compounds shown in Table 4 was used instead of magnesium dichloride in Example 1. Propylene was polymerized in the same way as in Example 1 using each of the catalysts obtained. The results are shown in Table 4.

TABLE 4

| Example | Raw material (B) for catalyst Name | Amount | Contents (% by weight) of the solid titanium catalyst component | | | | Results or polymerization | | | | | |
|---|---|---|---|---|---|---|---|---|---|---|---|---|
| | | | Ti | Cl | Organic acid ester | Al | Solid powder (g) | Soluble polymer (g) | Extraction residue of the powder (%) | Apparent density (g/ml) | melt index | Average specific polymerization activity * |
| 19 | Mg(OC₂H₅)Cl | 22g | 2.9 | 64 | 9.8 | 3.6 | 293 | 11.5 | 97 | 0.32 | 5.2 | 381 |
| 20 | Mg(OC₄H₉)Cl | 28g | 2.5 | 62 | 10.1 | 2.5 | 312 | 12.4 | 97 | 0.34 | 4.8 | 406 |
| 21 | Mg[O—C₆H₃-2.6-(CH₃)₂]Cl | 38g | 3.2 | 63 | 9.5 | 2.8 | 286 | 9.8 | 96 | 0.33 | 4.5 | 370 |
| 22 | Mg(OC₆H₅)Cl | 32g | 3.0 | 60 | 11.2 | 3.0 | 235 | 11.8 | 95 | 0.33 | 5.0 | 309 |
| 23 | Mg(OCOC₆H₅)Cl | 38g | 2.9 | 59 | 12.5 | 3.1 | 321 | 13.4 | 96 | 0.34 | 4.9 | 418 |

* g-PP/Ti-mmol · hr · atm

What we claim is:

1. A process for preparing a polymer or copolymer of an olefin having at least 3 carbon atoms which comprises polymerizing or copolymerizing an olefin having at least 3 carbon atoms and containing 0 to 10 mole% of another olefin or diolefin in the presence of a catalyst composed of (i) a solid titanium catalyst component and (ii) an organoaluminum compound; wherein the solid titanium catalyst component is obtained by contacting in the liquid phase and in the absence of mechanical copulverization (1) a magnesium containing copulverization product consisting essentially of:

(A) an aluminum or germanium compound selected from the group consisting of aluminum compounds of the formula $AlR_nX_{3-n}$ wherein R is a hydrogen atom, or an alkoxy group containing 1 to 12 carbon atoms, aryl group containing 6 to 12 carbon atoms, aryloxy group containing 6 to 12 carbon atoms or acyloxy group containing 2 to 13 carbon atoms and any of these groups may include a substitutent selected from the group consisting of alkyl containing 1 to 8 carbon atoms, aryl containing 6 to 12 carbon atoms, alkoxy containing 1 to 8 carbon atoms, aryloxy containing 6 to 12 carbon atoms, acyl containing 2 to 13 carbon atoms, and acyloxy containing 2 to 13 carbon atoms, X is a halogen atom, and $0<n\leq3$, and germanium compounds of the formula $GeR'_mX_{4-m}$ wherein R' is a hydrogen atom, or an alkyl group containing 1 to 8 carbon atoms, alkenyl group containing 2 to 8 carbon atoms, alkoxy group containing 1 to 12 carbon atoms, aryl group containing 6 to 12 carbon atoms, aryloxy group containing 6 to 12 carbon atoms or acyloxy group containing 2 to 13 carbon atoms and any of these groups may include a substitutent selected from the group consisting of alkyl containing 1 to 8 carbon atoms, aryl containing 6 to 12 carbon atoms, alkoxy containing 1 to 8 carbon atoms, aryloxy containing 6 to 12 carbon atoms, acyl containing 2 to 13 carbon atoms, and acyloxy containing 2 to 13 carbon atoms, and X is defined above, and $0\leq m\leq4$;

(B) a halogen-containing magnesium compound selected from the group consisting of magnesium dihalide and a halogen-containing organic magnesium compound containing halogen and an organic group selected from the group consisting of alkoxy groups with 1 to 12 carbon atoms, alkyl groups with 1 to 12 carbon atoms, acyloxy groups with 2 to 13 carbon atoms and aryloxy groups with 6 to 8 carbon atoms, and;

(C) an organic ester formed between a carboxylic acid or halocarboxylic acid selected from the group consisting of unsaturated aliphatic carboxylic acids containing 1 to 8 carbon atoms, halogen-substituted derivatives thereof, and aromatic carboxylic acids containing 7 to 14 carbon atoms, and an alcohol or phenol selected from the group consisting of saturated or unsaturated aliphatic primary alcohols containing 1 to 8 carbon atoms, saturated or unsaturated alicyclic alcohols containing 3 to 8 carbon atoms, saturated or unsaturated aliphatic primary alcohols containing 1 to 4 carbon atoms bonded to an alicyclic or aromatic ring with 3 to 10 carbon atoms, and phenols containing 6 to 10 carbon atoms, the compounds (A) and (B), or the compounds (A), (B) and (C) being mechanically copulverized, the amount of compound (A) being about 0.001 to about 10 moles per mole of compound (B), and the amount of compound (C) being about 0.005 to about 10 moles per mole of the compound (B), with;

(2) a titanium compound (D) of the formula $Ti(OR)_gX_{4-g}$ wherein R is an alkyl group, X is a halogen atom, and $0 \leq g \leq 4$, the Ti/Mg atomic ratio of the solid titanium catalyst component being about ½ to about 1/16 and the halogen/Ti atomic ratio being about 5 to about 40.

2. The process of claim 1 wherein the polymerization or copolymerization is carried out at a temperature of about 20° to about 200° C. under atmospheric pressure to about 50 kg/cm².

3. The process of claim 1 wherein the polymerization or copolymerization is carried out in the liquid phase using the solid titanium catalyst component (i) in an amount of about 0.001 to about 0.5 millimole per liter of liquid phase, and the organoaluminum compound (ii) in an amount of about 0.1 to about 50 millimoles per liter of liquid phase.

4. The process of claim 1 wherein the halogen-containing magnesium compound (B) is a magnesium dihalide.

5. The process of claim 1 wherein said organic ester (C) is a methyl or ethyl ester of benzoic acid, p-toluic acid or p-anisic acid.

6. The process of claim 1 wherein the compounds (A), (B) and (C) are mechanically copulverized and then contacted with the titanium compound (D) in the liquid phase in the absence of mechanical pulverization.

7. The process of claim 1 wherein the amount of compound (A) is about 0.01 to about 5 moles per mole of compound (B) and the amount of compound (C) is about 0.01 to about 1 mole per mole of compound (B).

8. The process of claim 1 wherein the polymerization or copolymerization is carried out in the presence of an aromatic carboxylic acid ester or its adduct with the organoaluminum compound (ii) as a stereo regularity controller.

9. The process of claim 8 wherein the amount of the stereo regularity controller is about 0.001 to about 10 moles per mole of the organoaluminum compound (ii).

10. The process of claim 1 wherein component (A) is said aluminum compound wherein R is an alkoxy group containing 1 to 12 carbon atoms.

11. The process of claim 10 wherein component (A) is $Al(OC_2H_5)_3$ or $Al(OC_2H_5)_2Cl$.

12. The process of claim 1, wherein component (A) is said germanium compound.

13. A catalyst for polymerizing or copolymerizing an olefin having at least 3 carbon atoms and containing 0 to 10 mole% of another olefin or diolefin, said catalyst comprising:

(i) a solid titanium catalyst component obtained by contacting in the liquid phase and in the absence of mechanical pulverization (1) a magnesium-containing copulverization product consisting essentially of (A) an aluminum or germanium compound selected from the group consisting of aluminum compounds of the formula $AlR_nX_{3-n}$ wherein R is a hydrogen atom, or an alkoxy group containing 1 to 12 carbon atoms, aryl group containing 6 to 12 carbon atoms, aryloxy group containing 6 to 12 carbon atoms or acyloxy group containing 2 to 13 carbon atoms and any of these groups may include a substituent selected from the group consisting of alkyl containing 1 to 8 carbon atoms, aryl containing 6 to 12 carbon atoms, alkoxy containing 1 to 8 carbon atoms, aryloxy containing 6 to 12 carbon atoms, acyl containing 2 to 13 carbon atoms and acyloxy containing 2 to 13 carbon atoms, X is a halogen atom, and $0 < n \leq 3$, and germanium compounds of the formula $GeR'_mX_{4-m}$ wherein R' is a hydrogen atom, or an alkyl group containing 1 to 8 carbon atoms, alkenyl group containing 2 to 8 carbon atoms, alkoxy group containing 1 to 12 carbon atoms, aryl group containing 6 to 12 carbon atoms, aryloxy group containing 6 to 12 carbon atoms or acyloxy group containing 2 to 13 carbon atoms and any of these groups may include a substituent selected from the group consisting of alkyl containing 1 to 8 carbon atoms, aryl containing 6 to 12 carbon atoms, alkoxy containing 1 to 8 carbon atoms, aryloxy containing 6 to 12 carbon atoms, acyl containing 2 to 13 carbon atoms and acyloxy containing 2 to 13 carbon atoms, X is as defined above, and $0 < m \leq 4$, (B) a halogen-containing magnesium compound selected from the group consisting of magnesium dihalide and a halogen-containing organic magnesium compound containing halogen and an organic group selected from the group consisting of alkoxy groups with 1 to 12 carbon atoms, alkyl groups with 1 to 12 carbon atoms, acyloxy groups with 2 to 13 carbon atoms and aryloxy groups with 6 to 8 carbon atoms, and (C) an organic acid ester formed between a carboxylic acid or halocarboxylic acid selected from the group consisting of unsaturated aliphatic carboxlic acids containing 1 to 8 carbon atoms, halogen-substituted derivatives thereof, and aromatic carboxylic acids containing 7 to 14 carbon atoms, and an alcohol or phenol selected from the group consisting of saturated or unsaturated aliphatic primary alcohols containing 1 to 8 carbon atoms, saturated or unsaturated alicyclic alcohols containing 3 to 8 carbon atoms, saturated or unsaturated aliphatic primary alcohols containing 1 to 4 carbon atoms bonded to an alicyclic or aromatic ring with 3 to 10 carbon atoms, and phenols containing 6 to 10 carbon atoms, compounds (A), (B) or compounds (A), (B), (C) being mechanically copulverized, the amount of the compound (A) being about 0.001 to about 10 moles per mole of compound (B) and the amount of compound (C) being about 0.005 to about 10 moles per mole of compound (B), with;

(2) a titanium compound (D) of the formula $Ti(OR)_gX_{4-g}$ wherein R is an alkyl group, X is a halogen atom and $0 \leq g \leq 4$, the Ti/Mg atomic ratio of the solid titanium catalyst component being about ½ to about 1/16 and the halogen/Ti atomic ratio being about 5 to about 40.

14. The catalyst of claim 13, wherein component (A) is said germanium compound.

* * * * *